Jan. 21, 1947.  C. G. VEINOTT  2,414,571
POLYPHASE ARMATURE WINDING
Filed Aug. 11, 1943
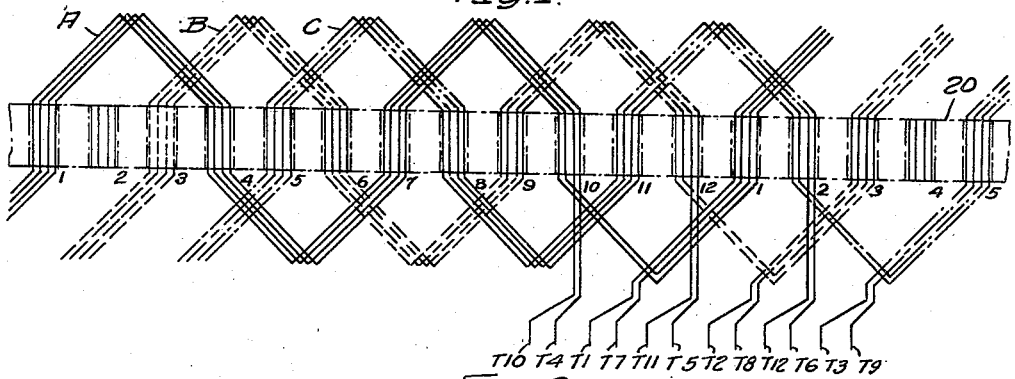
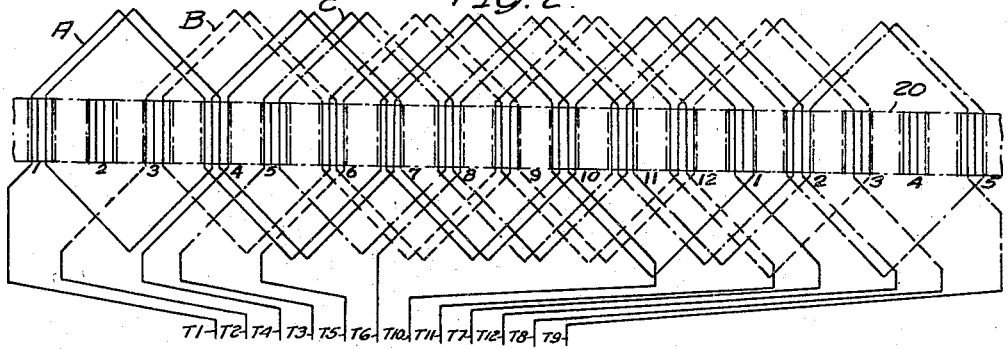
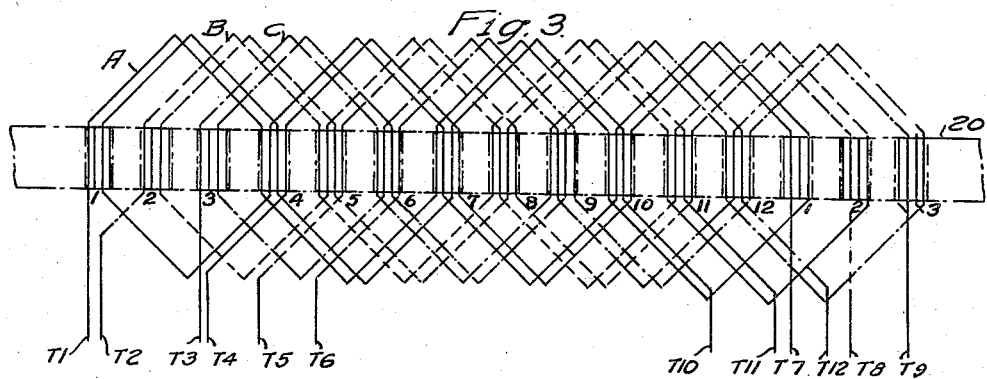
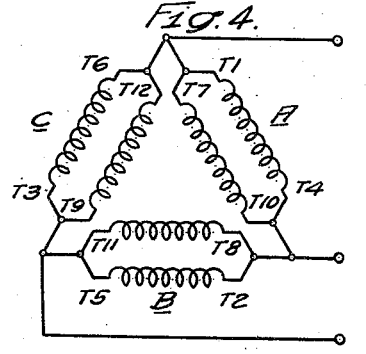
WITNESSES:
INVENTOR
Cyril G. Veinott.
BY
ATTORNEY Patented Jan. 21, 1947

2,414,571

UNITED STATES PATENT OFFICE 2,414,571

POLYPHASE ARMATURE WINDING

Cyril G. Veinott, Lima, Ohio, assignor to Westinghouse Electric Corporation, East Pittsburgh, Pa., a corporation of Pennsylvania Application August 11, 1943, Serial No. 498,219

6 Claims. (Cl. 171—206)

The present invention relates to armature windings for dynamoelectric machines, and, more particularly, to an armature winding for polyphase alternating-current dynamoelectric machines of small physical size and light weight, but with relatively high capacity. The armature winding of the present invention is especially intended for alternating-current generators used to supply the electrical load on aircraft, although its usefulness is not necessarily restricted to this particular application.

The principal object of the invention is to provide a multilayer armature winding for polyphase alternating-current dynamoelectric machines of small size and high capacity, in which the end turns of the winding are uniformly distributed around the periphery of the armature core, and are so arranged that they occupy a minimum amount of space. This arrangement has several advantages. The small space occupied by the end turns of the winding reduces the amount of space which must be provided in the end brackets of the generator to accommodate the end turns, and thus makes it possible to use smaller and, therefore, lighter end brackets than with previous designs. This is an important consideration in aircraft generators, in which the overall dimensions and the weight must be kept as small as possible. The uniform arrangement and small bulk of the end turns of the winding also facilitate the winding operation, and result in a generator having low end-leakage reactance.

A more specific object of the invention is to provide a full-pitch, multilayer armature winding for polyphase alternating-current generators having one slot per pole per phase, the winding being of the type in which a conductor is wound continuously from slot to slot around the core, as distinguished from the type of winding in which previously-formed coils are placed in the slots and then connected together, and which is arranged so that the end turns of the winding are very uniformly distributed around the core and occupy a minimum amount of space.

Further objects and advantages of the invention will be apparent from the following detailed description, taken in connection with the accompanying drawing, in which:

Figure 1 is a diagrammatic, developed view of an armature core and winding embodying the invention;

Figs. 2 and 3 are diagrammatic views similar to Fig. 1 showing other embodiments of the invention; and Fig. 4 is a simplified wiring diagram showing the electrical connections of the winding to the external circuit.

Fig. 1 shows a preferred embodiment of the invention. The winding shown in this figure is a three-phase winding for an alternating-current generator having an armature core 20, which may be supported on either the stator or the rotor of the machine, and which is preferably of the usual laminated construction. The particular machine selected for the purpose of illustration is a four-pole machine having twelve slots, which are numbered from 1 to 12, inclusive, on the drawing, although the invention is, of course, applicable to machines having any number of poles. As stated above, the winding is a three-phase winding, so that there is one slot per pole per phase, and the three phase windings of which the complete winding is composed are shown on the drawing by solid lines, dash lines and dot-dash lines, respectively. The armature winding of the present invention is of the type in which a conductor is wound continuously from slot to slot around the armature, as distinguished from the type of winding in which previously-formed coils are placed in the slots, and it is a multi-layer winding, the particular embodiment of the invention shown in the drawing having four layers or turns, so that there are four conductors disposed one above the other in each slot, the bottom conductor in each slot being at the left in the drawing, and succeeding conductors being shown in order to the right, as will be apparent from the following description of the winding.

In order to facilitate understanding of the invention, the disposition of the individual phase windings in the slots of the core 20 will first be described without regard to the actual winding procedure. Thus, starting with the phase winding designated A on the drawing and shown in full lines, a suitable conductor starts in the bottom of slot 1 of the core and extends from slot to slot around the core, being placed in one slot in each pole group. Since the winding is a full-pitch winding, having only one slot per pole per phase, and the conductor starts in slot 1, this end being designated T1, it extends from slot 1 to slot 4, thence to slot 7, and then to slot 10. Since the winding is a multilayer winding, this conductor might extend for a plurality of turns around the armature. It is preferred, however, to divide each phase winding into two branches, and the end of this first conductor is brought out from slot 10 and permitted to hang loose temporarily during the winding.

A second conductor of phase A also starts in slot 1, the beginning of this conductor being designated T7, and it similarly extends around the armature from slot 1 to slot 4 to slot 7 to slot 10. The winding of this conductor, however, is continued for a second complete turn around the armature, and at the end of the second turn, it is brought out from slot 10 at T10. The end of the first conductor, which lies in the bottom of slot 10, and which was permitted to hang loose during the winding of the second conductor, is carried to slot 1 and wound around the armature again from slot 1 to slots 4, 7 and 10, so that it lies in the top of each of these slots. The end of this first conductor is brought out from slot 10 at T4.

Thus, each of the slots of phase A is filled with four conductors lying one above the other and connected in two branches. In the arrangement described, it is desired to connect the two branches of each phase winding in parallel to obtain the desired voltage, and it is, therefore, preferable to place the two turns of one branch in the intermediate portion of the slot with the two turns of the other branch lying at the top and bottom of the slot, since the flux threading the slot varies slightly from top to bottom, and this arrangement of the windings tends to compensate for the slight variation in the induced voltage between the conductors at the top and bottom of the slot.

The winding of phase B is similar to that of phase A. The winding for phase B, however, does not start in the slot adjacent to the starting point for phase A, which would be the obvious and conventional arrangement, but starts in slot 3, so that there is one slot intervening between the starting points of these two phase windings. Starting at the winding terminal T2, a first conductor extends from slot 3 to slot 6, then to slot 9, and to slot 12, from which it is allowed to hang loose temporarily while the second branch of the winding is wound. The second branch, starting at the winding terminal T8, starts in slot 3 and extends for two turns around the core in slots 3, 6, 9 and 12 from which it is brought out as terminal T11. The first conductor, coming from the bottom of slot 12, is then wound around the armature core for another turn in the top of slots 3, 6, 9 and 12, and is brought out from the top of slot 12 at T5. Thus, the winding for phase B is identical with that for phase A, but it starts in a slot spaced by one intervening slot from the starting point of phase A.

The winding for phase C is identical to that for the other two phases, but it starts in a slot spaced by an intervening slot from the starting point of the preceding phase winding. Thus, the winding for phase C starts in slot 5, the terminal of the first conductor of this winding being designated T3, and it extends from slot 5 to slot 8 to slot 11 and to slot 2. As before, the end of this first conductor is permitted to hang loose temporarily while the second branch of the winding is wound. The second branch starts at the winding terminal T9 and extends from slot 5 to slots 8, 11 and 2 for two turns, the end being brought out from slot 2 as terminal T12. The first conductor, lying in the bottom of slot 2, is then given another turn around the armature in slots 5, 8, 11 and 2 to complete the phase winding, and its end is brought out from slot 2 as terminal T6.

In actually winding the machine, the three phases are not wound separately, as described above, since this would result in difficulty at the points where the end turns of the different phases cross. In the preferred method of winding, the first conductor of phase A, starting at T1, is wound from slot 1 to slots 4, 7 and 10 and allowed to hang loose temporarily, as described above. The first conductor of phase B, starting at T2, is then wound in slots 3, 6, 9 and 12, and the first conductor of phase C, starting at T3, is wound in slots 5, 8, 11 and 2, the ends of these conductors also hanging loose temporarily. Thus, at this point in the winding operation, there is a conductor in the bottom of each slot and three loose ends are left hanging. The second conductor of phase A, starting at T7, is then wound for two turns in slots 1, 4, 7 and 10, the end being brought out as terminal T10. The second conductors of phases B and C are successively wound in the same way for two turns in slots 3, 6, 9, and 12, and in slots 5, 8, 11 and 2, respectively, the terminals for phase B being at T8 and T11, and the terminals for phase C being at T9 and T12. There are now three conductors in each slot and three loose ends. The loose end from slot 10 is then wound in slots 1, 4, 7 and 10 and brought out as terminal T4. The loose end from slot 12 is wound in slots 3, 6, 9 and 12 and brought out as terminal T5, and the loose end from slot 2 is wound in slots 5, 8, 11 and 2 and brought out as terminal T6. Thus, each slot is filled with four conductors, and the arrangement of the winding is as previously described, but by winding in this manner, the end turns of the different phases are interlaced, and there is no interference at the points where they cross such as would occur if each phase were wound separately.

The three phases of the complete winding may be connected to the external circuit either in delta or in star, with the two branches of each phase in parallel, the delta connection being shown in Fig. 4. It will be apparent from Fig. 1 that with this arrangement of the windings, with the starting point of each phase winding spaced by at least one intervening slot from the starting points of the adjacent phase windings, the end turns of the winding outside the slots are uniformly distributed around the circumference of the armature core, so that the winding operation is facilitated and the space occupied by the end turns of the winding is kept to a minimum, since there are no bulky groups or bunches of end turns to require a large amount of space.

Fig. 2 shows another embodiment of the invention in which an even more uniform distribution of the end turns is obtained. In this figure, the three phases are designated A, B and C as before, and the different terminals of the winding are given the same designations as in Fig. 1. In this embodiment of the invention, the first turn of phase A, starting from T1 in slot 1 as before, is wound from slot 1 to slot 10 as previously described. The second conductor of phase winding A starts at T7 in slot 1 as before, but in this embodiment of the invention, it is wound around the core in the opposite direction from the preceding turn, extending from slot 1 to slot 10, then to slot 7, to slot 4 and back to slot 1. This conductor then reverses and is wound around the core for another turn in the same direction as the first turn, extending from slot 1 to slot 4, to slot 7, and to slot 10, from which it is brought out as terminal T10. The first conductor, lying in the bottom of slot 10, is carried to the top of slot 1 and extends for another turn around the core, but in the opposite direction to the preceding turn, extending from slot 1 to slot 10, to slot 7, and to slot 4, from which it is brought out as terminal T4. Phase windings B and C are arranged in an exactly similar manner to phase A, but start in slots 3 and 5, respectively, so that the starting points of the phase windings are spaced apart by intervening slots.

The actual winding operation is carried out in a similar manner to that described for Fig. 1. Thus, the first conductor of phase A is wound in slots 1, 4, 7 and 10, the first conductor of phase B is wound in slots 3, 6, 9 and 12, and the first conductor of phase C is wound in slots 5, 8, 11 and 2, the ends of these conductors hanging loose from slots 10, 12 and 2, respectively. The second conductor of phase A is then started in slot 1 and wound in the reverse direction to slots 10, 7, 4 and 1, and then reversed in direction for another turn, being wound back to slots 4, 7 and 10, from which it is brought out at T10. The second conductors of phases B and C are then successively wound in place in the same manner, each being given two turns around the core and each turn being in the reverse direction from the preceding turn. Finally, the loose ends of the first conductors of each phase are successively wound in the tops of the slots of the respective phases in the reverse direction from the preceding turns.

It will be seen that, in this embodiment of the invention, the electrical relations of the winding are the same as in Fig. 1, but that each layer of the multilayer winding is wound in the opposite direction around the core from the preceding layer. The effect of this arrangement will be apparent from Fig. 2, from which it will be seen that the end turns of the winding are very uniformly distributed around the circumference of the core, so that the space occupied by them is reduced to a minimum, and the winding operation is greatly facilitated because of the manner in which the end turns are separated and spread apart.

The embodiment of the invention shown in Fig. 3 also results in a very uniform distribution of the end turns. In this embodiment, the three phase windings are started in adjacent slots of the core, and succeeding turns of each phase winding are wound in opposite directions as in Fig. 2. Thus, the first conductor of phase A, starting at terminal T1, is started in slot 1 and extends around the core to slots 4, 7 and 10 as previously described. The second conductor of this phase winding, starting at T7, also starts in slot 1 and extends in the opposite direction around the core, extending from slot 1 to slot 10, to slot 7, to slot 4 and back to slot 1, from which the next turn extends in the opposite direction, to slot 4, to slot 7 and slot 10, from which the winding terminal T10 is brought out. The first conductor is carried from the bottom of slot 10 to the top of slot 1 and extends in the opposite direction to the preceding turn, from slot 1 to slot 10, to slot 7 and to slot 4, from which it is brought out as terminal T4. Phase B, starting at the terminal T2, starts in slot 2, which is adjacent to the starting point of phase A, and is disposed in the same manner as described for phase A, the terminals of this phase winding having the same designations as in Figs. 1 and 2. Phase C starts at the terminal T3 in slot 3, and is arranged in the same manner as the other two phases, the terminals of this phase winding also having the same designations as in the preceding figures.

The preferred winding procedure for this embodiment of the invention is similar to that for the previously described embodiments. The first conductors of the three phase windings are first wound in the bottoms of the slots, starting in slots 1, 2 and 3. The second conductors are then successively wound in place, starting in the same slots as the first conductors and each being wound for two turns with each turn in the opposite direction to the preceding turn. Finally, the first conductor of each phase is given another turn in the top of the slots in the opposite direction to the preceding turn.

Thus, this embodiment of the invention differs from those of Figs. 1 and 2 in that the several phase windings are started in adjacent slots rather than having their starting points separated by an intervening slot, and the winding operation itself is carried out in the same manner as in Fig. 2. It will be seen from Fig. 3 that this embodiment of the invention also results in an extremely uniform distribution of the end turns of the winding with the same advantages as those described above in connection with the other figures.

It should now be apparent that an armature winding for a polyphase alternating-current generator has been provided in which the end turns of the winding are very uniformly distributed, so that they occupy a minimum of space, thus making possible a reduction in the size and weight of the end brackets of a machine in which this winding is used, as well as facilitating the winding operation. The invention is, of course, capable of various modifications and embodiments, three specific embodiments having been described. It will be understood, however, that various other changes might be made within the scope of the invention. Thus, the invention is not necessarily restricted to a winding in which each phase is divided into two parallel-connected branches, but each phase winding might consist of a single conductor wound for a plurality of turns around the armature, or the two branches, wound as described, might be connected in series rather than in parallel. The invention is not restricted to any specific number of turns, but is applicable to any multilayer winding of the type described. It is to be understood, therefore, that, although certain specific embodiments of the invention have been shown and described for the purpose of illustration, the invention is not restricted to these particular arrangements, but in its broadest aspects it includes all equivalent modifications and embodiments which come within the scope of the appended claims.

I claim as my invention:

1. An armature winding for a polyphase dynamoelectric machine having one armature slot per pole per phase, said armature winding comprising a plurality of phase windings, each phrase winding consisting of a plurality of turns of at least one continuous conductor extending from slot to slot around the armature to form a multilayer winding, the starting points of the several phase windings being separated from each other by at least one intervening slot.

2. An armature winding for a polyphase dynamoelectric machine having one armature slot per pole per phase, said armature winding comprising a plurality of phase windings, each phase winding consisting of a plurality of turns of a conductor extending from slot to slot around the armature to form a multilayer winding, the starting points of the several phase windings being separated from each other by at least one intervening slot, and successive layers of each phase winding being wound in opposite directions around the armature.

3. In an alternating-current dynamoelectric machine having a slotted armature core, an armature winding disposed in the slots of said core, said winding comprising a plurality of phase windings, each of said phase windings consisting of a plurality of turns of at least one continuous conductor extending around the armature core and lying in one slot of each pole group of the winding, the starting points of the several phase windings being separated from each other by an intervening slot.

4. In an alternating-current dynamoelectric machine having a slotted armature core, a multilayer armature winding disposed in the slots of said core, said winding comprising a plurality of phase windings, each of said phase windings consisting of a plurality of turns of a conductor extending around the armature core and lying in one slot of each pole group of the winding, the starting points of the several phase windings being separated from each other by an intervening slot, and successive layers of each phase winding being wound in opposite directions around the core.

5. In an alternating-current dynamoelectric machine having a slotted armature core, an armature winding disposed in the slots of said core, said winding comprising a plurality of phase windings, each of said phase windings consisting of a plurality of turns of at least one continuous conductor lying in slots one pole pitch apart, whereby a multilayer, polyphase armature winding is formed having one slot per pole per phase, the starting point of each of said phase windings being separated by at least one intervening slot from the starting point of the adjacent phase winding.

6. In an alternating-current dynamoelectric machine having a slotted armature core, an armature winding disposed in the slots of said core, said winding comprising a plurality of phase windings, each of said phase windings consisting of a plurality of turns of a conductor lying in slots one pole pitch apart, whereby a multilayer, polyphase armature winding is formed having one slot per pole per phase, the starting point of each of said phase windings being separated by at least one intervening slot from the starting point of the adjacent phase winding, and successive layers of each phase winding being wound in opposite directions around the core.

CYRIL G. VEINOTT.